United States Patent [19]

Rueb et al.

[11] Patent Number: 5,661,667
[45] Date of Patent: Aug. 26, 1997

[54] 3D IMAGING USING A LASER PROJECTOR

[75] Inventors: Kurt D. Rueb, Kitchener; Richard Michael Bordignon; John Wieczorek, both of Waterloo; David J. Wigg, Kitchener, all of Canada

[73] Assignee: Virtek Vision Corp., Waterloo, Canada

[21] Appl. No.: 368,528

[22] Filed: Jan. 4, 1995

Related U.S. Application Data

[63] Continuation-in-part of Ser. No. 212,665, Mar. 14, 1994, Pat. No. 5,381,258.

[51] Int. Cl.$^6$ .......................... G01B 11/00; G02B 26/08
[52] U.S. Cl. .................. 364/525; 364/559; 364/560; 356/375; 348/202; 359/202
[58] Field of Search .................. 359/202, 201, 359/221; 358/285; 364/475, 559, 560; 348/202, 203, 207; 356/375, 372

[56] References Cited

U.S. PATENT DOCUMENTS

| | | | |
|---|---|---|---|
| 3,304,834 | 2/1967 | Ollifisch et al. | |
| 4,569,024 | 2/1986 | Reichert et al. | 364/475 |
| 4,575,625 | 3/1986 | Knowles | 235/467 |
| 4,580,345 | 4/1986 | Andrew | 33/21.3 |
| 4,739,487 | 4/1988 | Bonnet et al. | |
| 4,797,749 | 1/1989 | Paulsen | 358/302 |
| 4,816,920 | 3/1989 | Paulsen | 358/285 |
| 5,048,904 | 9/1991 | Montagu | 359/202 |
| 5,146,463 | 9/1992 | Rando | 372/24 |
| 5,150,249 | 9/1992 | Montagu | 359/202 |
| 5,218,427 | 6/1993 | Koch | 356/376 |
| 5,237,444 | 8/1993 | Schermer | 359/202 |
| 5,285,397 | 2/1994 | Heier et al. | 364/559 |
| 5,309,273 | 5/1994 | Mori et al. | 359/202 |
| 5,341,183 | 8/1994 | Dorsey-Palmateer | |
| 5,381,258 | 1/1995 | Bordignon et al. | 359/202 |
| 5,388,318 | 2/1995 | Petta | 29/897 |

FOREIGN PATENT DOCUMENTS

| | | |
|---|---|---|
| 2096147 | 12/1993 | Canada. |
| 1326711 | 2/1994 | Canada. |
| 1327850 | 3/1994 | Canada. |
| 2075185 | 11/1981 | United Kingdom. |
| 87/06353 | 10/1987 | WIPO ........................ G01S 5/16 |
| 92/16817 | 10/1992 | WIPO. |

OTHER PUBLICATIONS

Ikumatsu Fujimoto et al. "Two Dimensional Large Scale Laser Digigitizer with a Cordless Cursor" IMTC93 IEEE Instrumentation and Measurement Conference, Irvine California, 18 May 1993.

Rueb, K, "Hypothesis Refinement for 3D Scene Interpretation", PhD Thesis, University of Waterloo, 1990, pp. 25–55, 77–81, 87–92.

(List continued on next page.)

*Primary Examiner*—Emanuel T. Voeltz
*Assistant Examiner*—Kamini S. Shah
*Attorney, Agent, or Firm*—Jeffrey T. Imai; Arne I. Fors; D. Doak Horne

[57] ABSTRACT

A method for generating 3D data of an object using a laser projector uses the steps of calibrating at least two laser projectors to a known coordinate system relative to an object; projecting a first laser beam along a path to a point on the object; placing a reflection target at the point for reflecting the first laser beam for generating a first feedback signal indicative of the first laser beam hitting the reflective target; calculating first vector coordinates of the path of the first laser beam; projecting a second laser beam towards the point; moving the second laser beam in a predetermined pattern until the second laser beam reflects off of the reflective target generating a second feedback signal indicative of the second laser beam hitting the reflective target; calculating second vector coordinates of the path of the second laser beam; triangulating the first vector coordinates with the second vector coordinates establishing a digitized 3D coordinate of the point relative to the coordinate system; responsive to an external signal, storing the 3D coordinate in an electronic memory storage device; manipulating the target reflector to points of interest on the surface; and repeating the steps to generate a series of digitized 3D coordinates.

46 Claims, 9 Drawing Sheets

OTHER PUBLICATIONS

Brochure entitled: "HYSCAN 3-D Laser Digitizer", Hymarc Ltd., Ottawa, Canada, 1989.

Brochure entitled: "Civil Engineering Systems", Leica AG, Heerbrugg, Switzerland, 1994.

Blake, Scott: "Replacing Composite Hand Layup Templates with a Simple Projection System", 34th International SAMPE Symposium, May 8–11, 1989, pp. 362–372.

Fujimoto et al.; "A two dimensional large scale laser digitizer with a cordless cursor"; IEEE May 1993.

3D IMAGING USING A LASER PROJECTOR

This application is a continuation-in-part application of application Ser. No. 08/212,665, filed Mar. 14, 1994 now U.S. Pat. No. 5,381,258.

FIELD OF INVENTION

This invention relates to a method of generating 3 dimensional (3D) data of an object using a laser projector.

BACKGROUND OF INVENTION

Laser projectors are used to project images onto surfaces. The projected images are used as patterns for manufacturing products such as leather products, roof trusses and aircraft parts and tools.

Laser scanners such as those described in U.S. Pat. No. 5,237,444 have been used to project a pattern onto a cylindrical object surface. A focused laser beam is deflected by the use of two orthogonally placed scanners causing the laser beam to follow a varying optical path to various object points. The scanners each pivotally rotate a mirror which will direct the laser beam to any point on the object's surface. This type of scanner can accept CAD data to project a very accurate image onto the object's surface. However, these scanners are useful only to project an image.

In still other types of scanners as disclosed in U.S. Pat. Nos. 4,797,747, 4,816,920, 5,048,904 and 5,150,249, scanning systems project an image onto a two dimensional surface. These scanners are used for projecting images for laser printers or reading an image from a surface for facsimile image transmission devices. In this type of apparatus, a beam splitter is used to direct a portion of the laser beam to a photo detector or sensor that monitors the beam intensity and provides a corresponding feedback signal to a logic controller or host computer to maintain a constant beam intensity. By using a beam splitter, the laser beam is attenuated resulting in a loss of power which can be as high as 50%.

Still other optical scanners utilize a conventional laser projector with optical sensors mounted on the object itself. When the laser beam contacts the optical sensor, a corresponding signal is generated and sent back to a logic controller. However, this system requires that the optical sensors be wired directly to the logic controller. In many heavy industrial situations, a series of wires is unacceptable for implementation.

These scanning applications begin with the generation of computer aided design (CAD) data. The laser projector interprets the CAD data and projects the pattern onto the surface to be used. For parts designed with CAD or simple parts, a CAD data file is readily available or can be easily generated. However, for complicated products designed without the benefit of a CAD system, the CAD data cannot be easily generated.

This problem is particularly acute in the aircraft industry where many aircraft which are still in service were not designed with the benefit of CAD. All parts, including replacement parts, and tools for making such parts must be manufactured without CAD.

Many of these parts and tools were manufactured by applying a patterned MYLAR sheets onto a surface to be machined. The generation of patterned MYLAR sheets can take up 6–8 weeks to produce. The application of MYLAR sheets to surfaces which are curved in more than one dimension causes the MYLAR sheet to buckle, dramatically decreasing the accuracy of the desired pattern.

For parts and tools which do not have readily available CAD data describing the part or tool, CAD data could be generated either by redesigning the tool or part using CAD or by digitizing the tool or part directly from an existing part. Both solutions pose problems relating to the accuracy of the generation of accurate CAD data.

Several apparatus exist for digitizing parts or tools. A laser beam can be projected at a tool or part. The reflected light is received by video equipment which interpret the received light and the angle of reflectance to triangulate the point of reflectance and fix its point in 3 dimensional space. By repeating the process for different locations on the tool or part CAD data may be generated to facilitate the manufacture of additional parts. However, this process could be time consuming and the degree of accuracy is dependent upon the relative lack of motion. Additionally, a dedicated system must be purchased.

In a commonly assigned United States patent application, Ser. No. 08/212,665, filed Mar. 14, 1994, a laser projector is described. The laser projector uses a wedge-shaped lens having a central aperture. The laser beam is focused through the aperture preventing attenuation of the laser beam. The laser beam is then projected towards a pair of galvanometers which directs the laser beam to a surface in a predetermined pattern. A reflector is used to reflect the laser beam back to its source. Since the return beam is more diffuse or wider than the focused laser beam, the laser beam will be refracted by the wedge-shaped lens to a sensor. On receipt of light, the sensor will generate a feedback signal.

This type of laser projector can place an object in 3D space by using known theories (see Rueb, K.: "Hypothesis Refinement for 3D Scene Interpretation", PhD Thesis, University of Waterloo, 1990). By knowing the dimensions of a number of reflectors on a surface relative to each other, the position of the object relative to the laser projector can be calculated. Once calibrated, the laser projector can project a predetermined image onto a surface using a CAD data file.

Heretofore, such laser projectors have only been used to project an image or pattern onto a surface.

SUMMARY OF THE INVENTION

The disadvantages of the prior art may be overcome by providing a method of generating CAD data of an object using at least 2 laser projectors capable of generating a feedback signal from the object surface.

According to one aspect of the invention, there is provided a method for generating 3D data of an object using a laser projector. The steps include calibrating at least two laser projectors to a coordinate system relative to an object; projecting two laser beams along respective paths to a desired point on the object; calculating vector coordinates for each respective path of the laser beams when each of the laser beams intersects the point; and triangulating the vector coordinates establishing a digitized 3D coordinate of the point relative to the coordinate system.

According to one aspect of the invention, there is provided a method for generating 3D data of an object using a laser projector. The steps include calibrating at least two laser projectors to a coordinate system relative to an object; projecting at least two laser beams to a desired point on said object; calculating vector coordinates for each of said laser beams when each of said laser beams intersects said point; and triangulating said vector coordinates establishing a digitized 3D coordinate of said point relative to said coordinate system.

According to another aspect of the invention, there is provided a method which includes the steps of calibrating at least two laser projectors to a known coordinate system relative to an object; projecting a first laser beam along a path to a point on the object; placing a reflection target at the point for reflecting the first laser beam for generating a first feedback signal indicative of the first laser beam hitting the reflective target; calculating first vector coordinates of the path of the first laser beam; projecting a second laser beam along a path towards the point; moving the second laser beam in a predetermined pattern until the second laser beam reflects off of the reflective target generating a second feedback signal indicative of the second laser beam hitting the reflective target, calculating second vector coordinates of the path of the second laser beam; triangulating the first vector coordinates with the second vector coordinates establishing a digitized 3D coordinate of the point relative to the coordinate system, responsive to an external signal, storing the 3D coordinate in an electronic memory storage device; manipulating the target reflector to points of interest on the surface, and repeating the steps to generate a series of digitized 3D coordinates.

According to another aspect of the invention, a predetermined image can be projected onto the surface intermittently when the target is not actively moving.

According to another aspect of the invention, a computer is provided with a receiver for receiving high frequency signals from a remote transmitter and a remote transmitter is used by an operator for remotely signalling the computer to store a 3D coordinate data in an electronic memory storage device.

DESCRIPTION OF THE DRAWINGS

In drawings which illustrate embodiments of the invention,

FIG. 8A-B is a flowchart of the system calibration of the present invention;

DETAILED DESCRIPTION OF THE INVENTION

Figure 1:
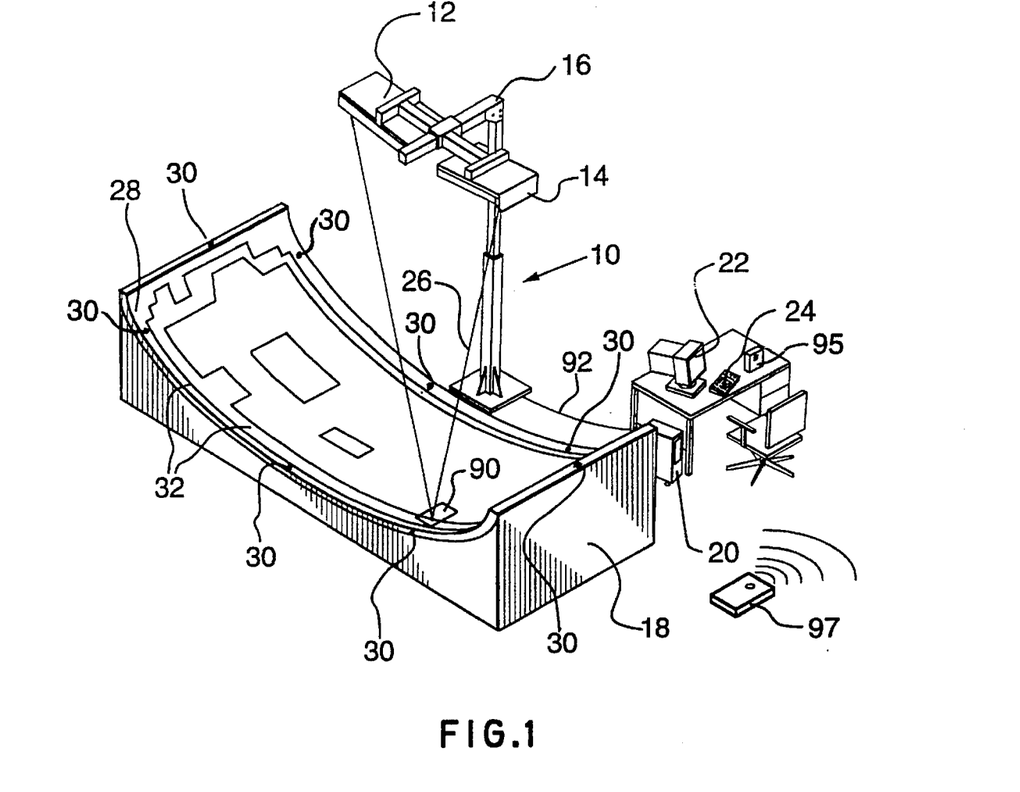
FIG. 1 is a perspective view of the present invention projecting an image onto a layout tool surface.

The present invention is illustrated in FIG. 1 and generally indicated at 10. The system comprises laser projectors 12 and 14 mounted on a support structure 16 which suspends the laser projectors 12 and 14 over top of layout tool 18. Laser projectors 12 and 14 are serially connected to each other by cables and connected to host computer 20 which includes a monitor 22 and keyboard 24. Laser projectors 12 and 14 each emit a laser beam 26 onto surface of layout tool 18. Surface 28 can be any contour, including planar and curvilinear. Spaced about the outer perimeter of surface 28 are target reflectors 30.

Figure 2:
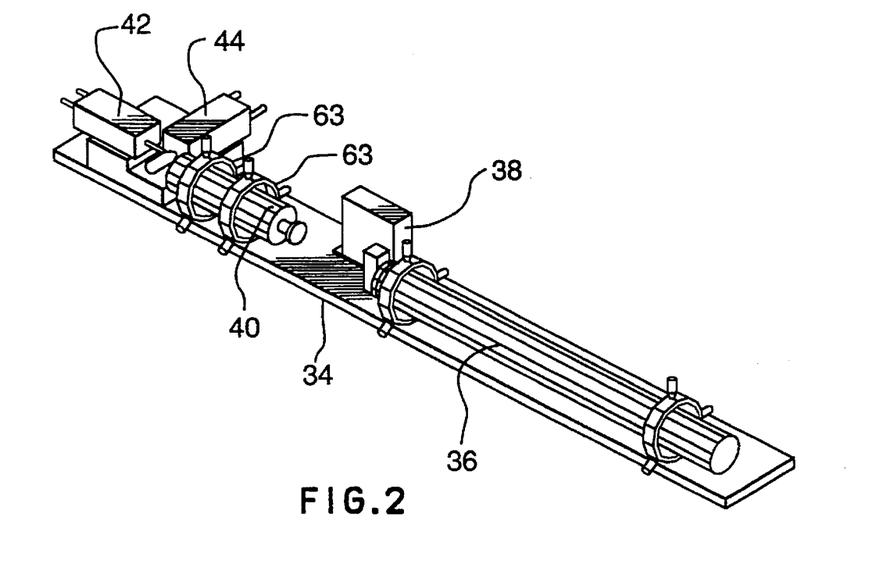
FIG. 2 is a perspective view in an inverted condition of the laser projector of the invention of FIG. 1 with the housing removed.

Referring to FIG. 2, the laser projector is illustrated. The projector comprises an elongated base plate 34. At one end of the base plate is a laser light source 36 having a laser intensity controller 38 electrically connected to the laser light source 36 for controlling the intensity of the laser light source 36. Preferably laser light source is a helium-neon laser.

In alignment with the laser beam projected by laser 36 is a focus and sensor detection device 40. Focus and sensor detection device 40 focuses the laser beam for projecting a light beam to scanners 42 and 44. Scanners 42 and 44 are orthogonally mounted, with scanner 42 substantially in alignment with the laser beam and scanner 44 mounted orthogonally thereto. Scanners 42 and 44 are commercially available from Cambridge Technologies Incorporated.

Figure 3:
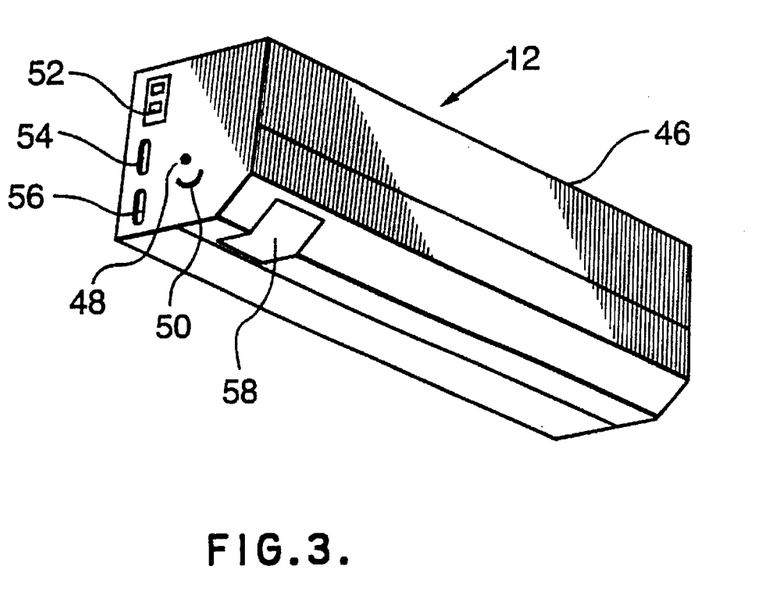
FIG. 3 is a perspective view the laser projector of the invention of FIG. 1 with housing.

Referring to FIG. 3, the projector with housing 46 is illustrated. Mounting plate 34 is mounted within housing 46 and between opposite ends thereof by screws 48 which project into the ends of mounting plate 34. A second screw (not illustrated) extends through a slotted opening 50 in the ends of housing 46 which is used to provide some adjustment for the projection of the laser beam. The housing is also provided with an on/off switch and power connector 52. Cable jack 54 is also mounted on the end of housing 46 for receiving a standard printer cable which operably connects the projector 12 to host computer 20. A second jack 56 is also provided for serially connecting laser projector 12 with laser projector 14.

Housing 46 also has a window 58 for allowing the laser beam to exit and re-enter the housing.

Figure 4:
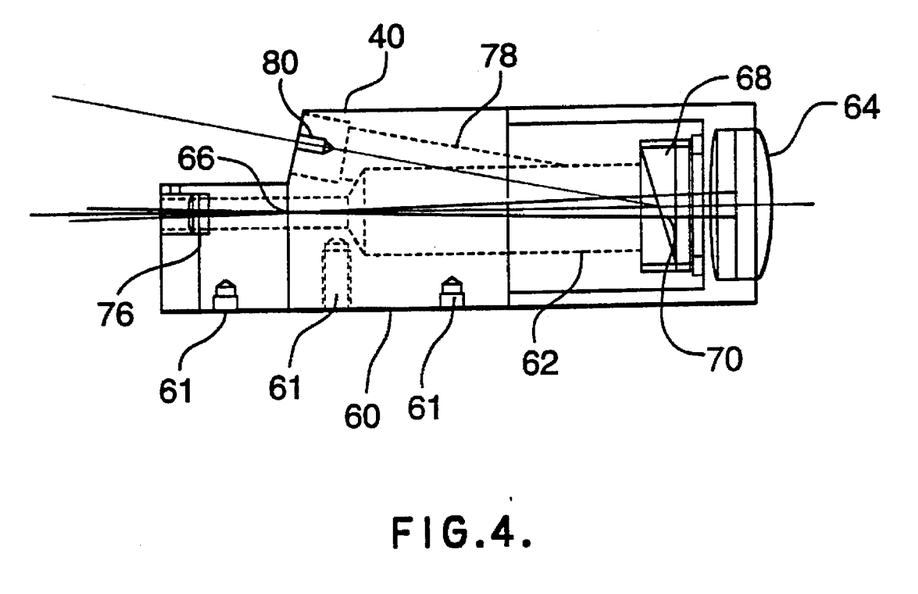
FIG. 4 is a side elevation view of the focus and sensor detection device of the invention of FIG. 1.

Referring now to FIG. 4, the focus and sensor detection device 40 is illustrated in greater detail. Device 40 comprises a housing 60 having a longitudinal central stepped bore extending therethrough. Lens 64 is mounted at the output end of bore 62. Lens 64 is a collimating lens designed to receive a focused laser beam and collimate the beam.

Adjacent lens 64 is a wedge-shaped lens 68 which has a central bore 70 extending therethrough. Lens 68 has an angled face 72 and an input face 74. The angled face 72 relative to face 74 has a face angle of preferably 10°. Any face angle from about 5° up to about 45° may be used. Lens 68 is preferably made from glass with the angled face 72 and input face 74 being polished.

At the input end of stepped bore 62 is a focusing lens 76. Lens 76 focuses the laser light beam to a focal point 66.

Angled away from stepped bore 62 is channel 78 which has an angle corresponding to the face angle wedge-shaped lens 68. At the end of channel 78, is photo sensor 80. Photo sensor 80 is electrically connected to the host computer 20 and generates a signal whenever sensor 80 receives a light beam. The location of sensor 80 is on a radial arm having the same radial length as the distance between lens 64 and the focal point 66.

Housing 60 may be affixed to the base plate 34 by any suitable means. In FIG. 4, the housing is provided with a plurality of tapped bores 61 which receive bolts to affix the housing 60 to the base plate 34. In FIG. 2, brackets 63 which have bolts for cradling the housing 60 are used. Any method may be used to mount housing 60 on the base plate 34, provided there is some method of accurately aligning the lenses 64 and 76 with the laser beam.

Figure 5:
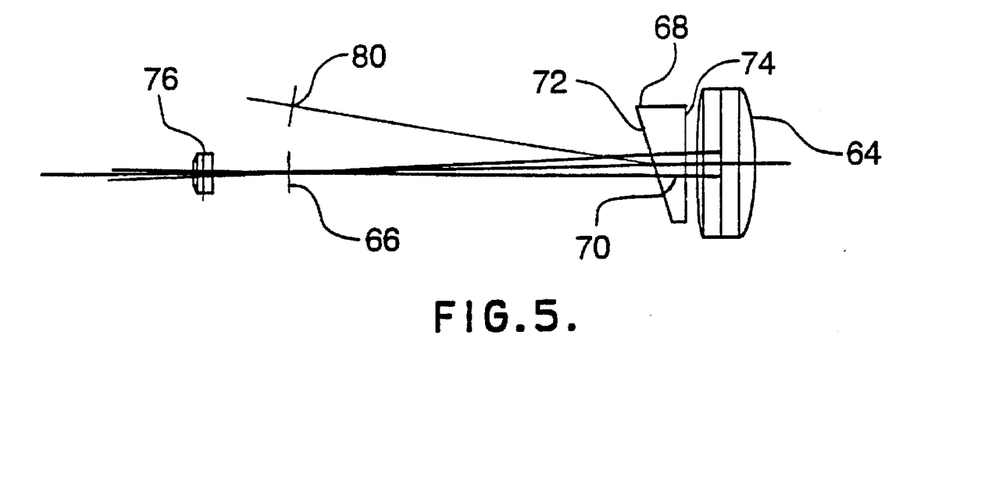
FIG. 5 is a schematic view of the lens arrangement of the focus and sensor detection device of FIG. 4.

Referring to FIG. 5, the optics of the system is more clearly illustrated. Lens 76 receives a light beam from the laser 36. The lens 76 focuses the light beam to a focal point 66. Beyond the focal point is lens 64 which redirects the light back into a focused parallel light beam. The size of aperture 70 of wedge-shaped lens 68 is such that the laser beam after it passes through lens 76 it does not pass through the lens portion of wedge-shaped lens but rather through the central aperture 70. In this way, the originating laser light beam is not attenuated. The laser light beam will pass through lens 64 to the mirrors mounted on scanners 42 and 44, and may projected onto the surface 28 of layout tool 18. The laser light beam will be reflected off target reflectors 30 directly back to the focus and detection device 40 on the same path. As the beam travels and is reflected off the retroreflectors, the beam increases in width or blobs out as it returns. The laser beam will pass back through lens 64 towards wedge-shaped lens 68. Since the beam is now greater in diameter than the diameter of aperture 70 part of the beam will now be refracted towards photo sensor 80. Upon receiving light, sensor 80 will generate a feedback signal which is sent to host computer 20.

Figure 6:
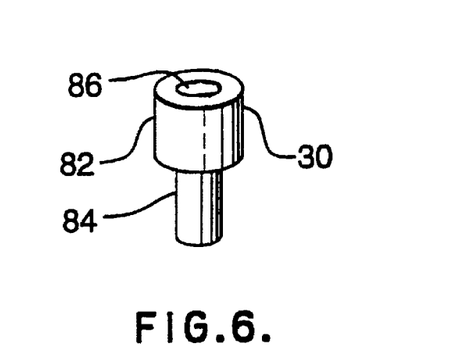
FIG. 6 is a perspective view of a target reflector of the invention of FIG. 1.
Figure 7:
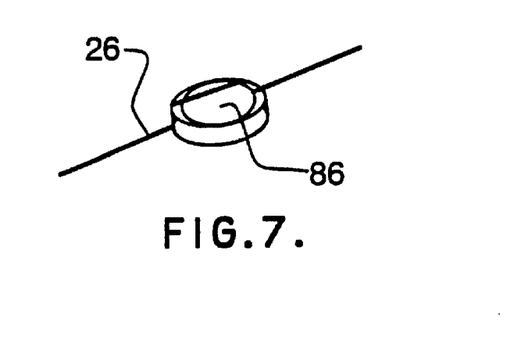
FIG. 7 is a perspective view of the target reflector of FIG. 6 reflecting a laser beam.

Referring to FIGS. 6 and 7, target reflector 30 which is mounted about the surface 28 of layout tool 18 a small machined pin 84 with a small precisely positioned retroreflective target 86, which is a homogeneous field of small beads which reflect the laser light back to its source. It has been found that the retroreflective material used in traffic signs have the required reflective property. However, other retroreflective material are also contemplated within the scope of this invention.

The target reflector 30 is removable but is durable and can withstand high temperatures. Surface 28 is provided with pinholes 31 which frictionally receive pin 84. The precise location of these pinholes 31 relative to the pattern 32 to be projected thereon will be known to the host computer 20.

Each laser projector 12, 14 consists of drive electronics, a laser light source 36, laser intensity control 38 and a high speed mirror deflection system 42, 44. At any instant, the system is projecting only a single spot, however, by tracing the spot over the same projection outline very rapidly, the appearance of a constant image is produced.

The galvanometers in scanners 42 and 44 are scanned through intermediate points at preferably 100 microsecond intervals and a single high resolution step of the scanning mirror produces a shift of less than 0.002 inch on a surface 10 feet from the scanner.

The laser intensity control 38 dynamically adjusts the laser intensity, increasing laser intensity when the laser moves faster to maintain an even intensity line projection while maintaining safe laser light levels when the beam is not scanned. The intensity control 38 also allows instantaneous blanking of the laser beam when multiple segments are displayed.

The projectors 12 and 14 are mounted to the support stand 16 using mounting holes on the top surface of the projector unit. Fine adjustment of the projection angle (15 degrees) within the fixed projection window is possible using the projection angle adjustment screws 50. The 25-pin cable 92 from the printer port of computer enters from the printer cable input connector 54 and is "daisy chained" to the next projector using the output 25 pin connector 56. Cables are keyed to prevent incorrect connection.

Figure 8:
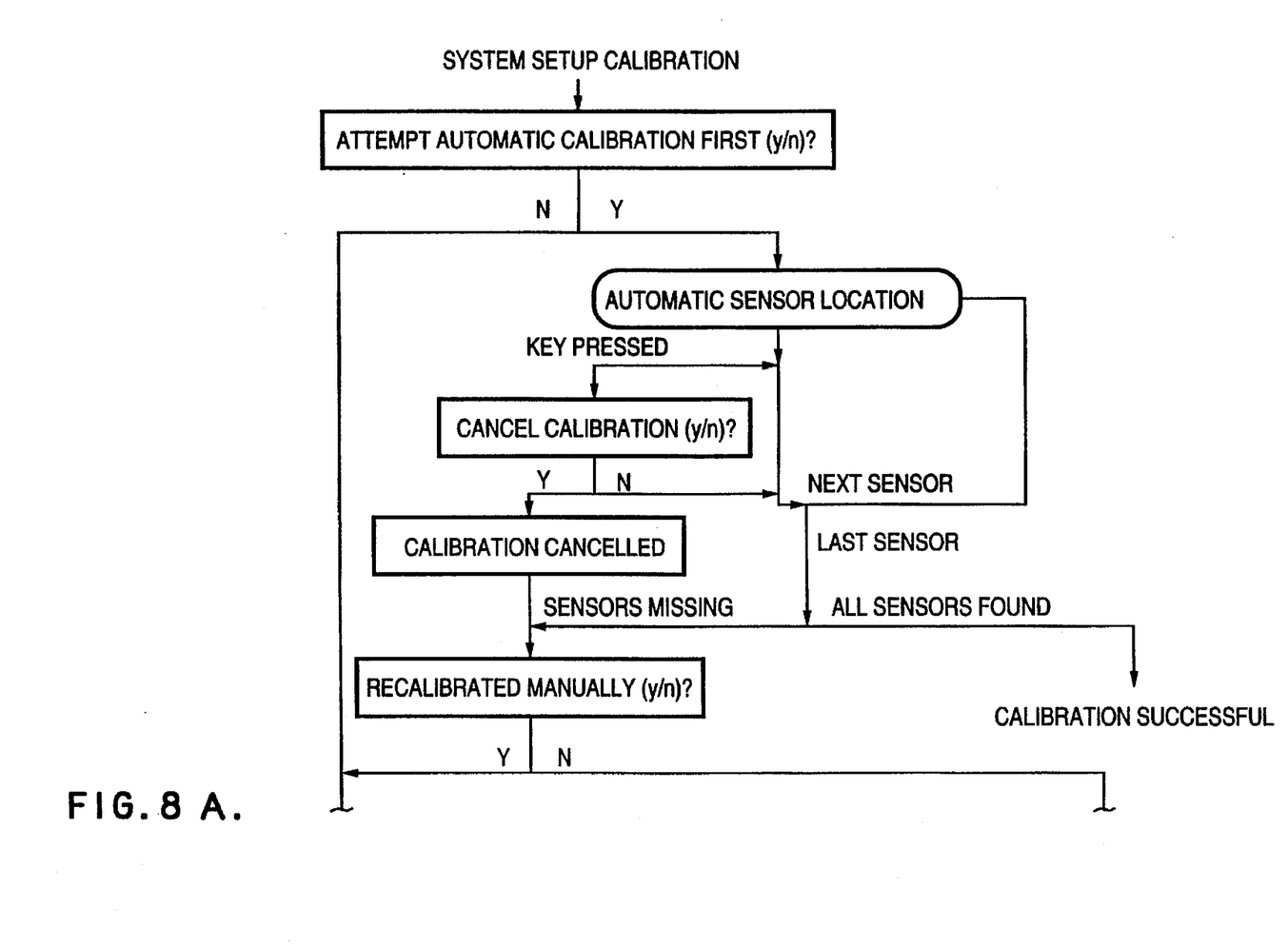
Figure 8B:
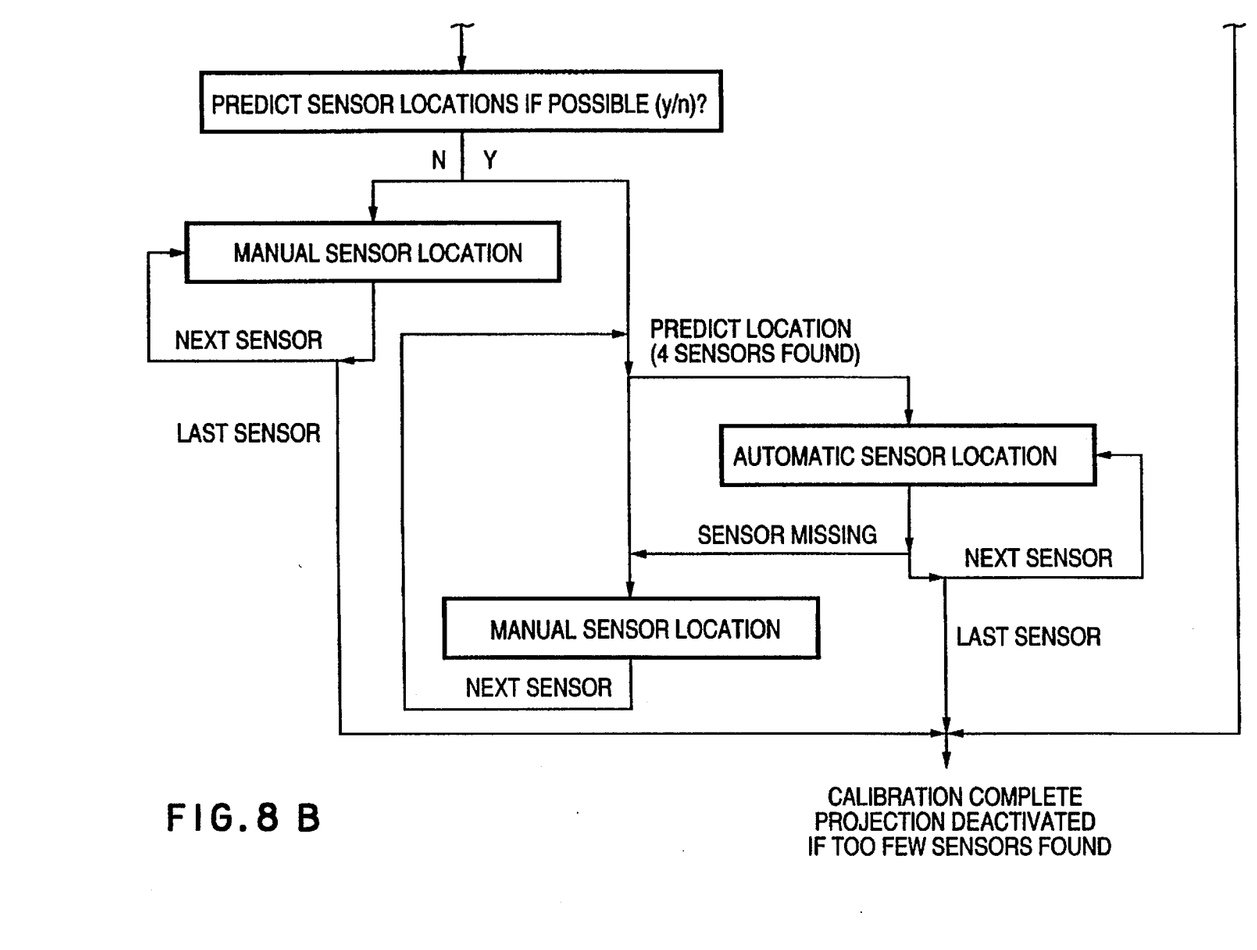

Projector 12 will initially locate the target reflectors automatically if the coordinates of the targets are known and stored in a tool calibration file. If coordinates are not known, the operator selects the starting position of the laser spot for each target reflector search using the computer mouse. The laser spot will follow the mouse movement. When the laser spot is close to the target reflector (within 2") the LEFT mouse button is pressed to initiate an automatic search for the precise target reflector location. A flowchart is illustrated in FIG. 8 which provides an outline of the overall procedure.

Once the reference locations have been established, the computer calculates the projector location using the algorithm described below and evaluates projector characteristics to the level defined by the refine command line parameters. The process terminates either i) when the command line specified error level is attained, ii) when no further improvement is possible or iii) when processing time has been excessive.

The process is repeated for projector 14.

In normal operation, laser parameters will be correct and only calculation of shifted tool or projector position will be necessary to reduce error to within the specified tolerance. In this instance, recalculation should require less than a second after locating all target reflector positions. If the desired error level cannot be attained even with projector characteristics evaluation, the most likely cause of error is an incorrectly detected target reflector position or an incorrect 3D coordinate.

At least four target reflectors are required for calibration of the laser projector to calibrate the position of the laser projector relative to the reference. However, if other physical parameters of the scanner mechanism (e.g. mirror center position, laser misalignment, temperature drift) are to be compensated, at least six target reflectors must be located for a complete evaluation.

Figure 9:
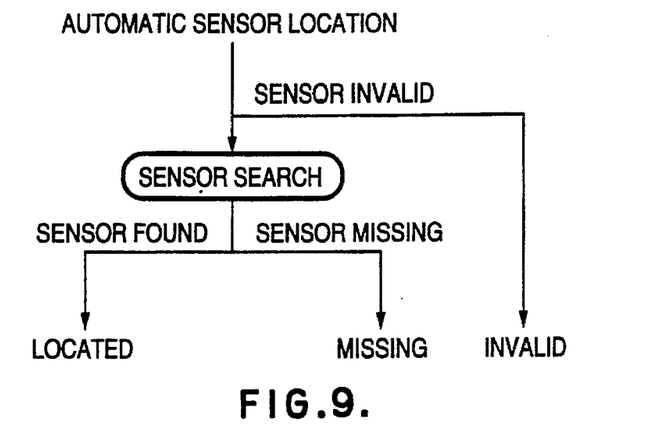
FIG. 9 is a flowchart of the automatic target reflector location of the present invention.

Referring to FIG. 9, the system can be set to predict the expected location of any remaining target reflectors once a sufficient number have been identified by the operator. Usually at least four target reflectors are required, although more may be required if the first four are redundant, for example, arranged in a line. When the target reflector locations can be predicted, target reflectors will be located automatically. If a target reflector cannot be located, a manual location will be used as a backup procedure.

Note that manual target reflector location allows the operator to mark a target reflector as INVALID, to be ignored by the system or MISSING if a valid target reflector location cannot be obtained. Any target reflector marked INVALID will not be recorded when the tool calibration fie is saved. Note that since the system can function with missing target reflectors, target reflector invalidation should only be used when no further use of a target reflector position is expected.

The calibration may be terminated at any time by pressing a confirmation key at the resulting cancellation prompt. If calibration is canceled, all target reflectors will be marked as missing.

If too few target reflectors are located to reliably locate the tool, the projector will be marked as inactive and will be deactivated with the affected laser being blanked and its scanning halted. When automatic clipping is active, other projectors will be reassigned to cover the missing projector data where possible.

Automatic target reflector location proceeds without operator intervention but will ignore any target reflectors earlier marked INVALID by the operator.

Figure 10:
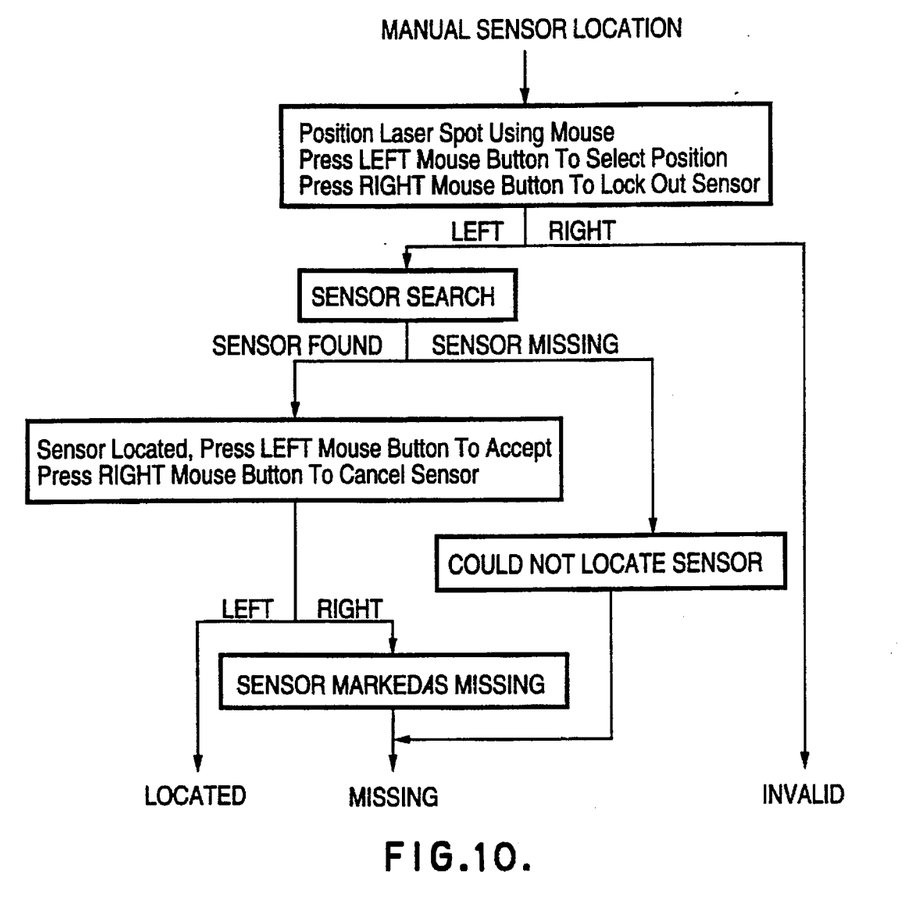
FIG. 10 is a flowchart of the manual target reflector location of the present invention.

Referring to FIG. 10, manual target reflector location requires the operator to first position the laser spot, using the mouse, close to the target reflector position. If the RIGHT mouse button is pressed at this time, the target reflector will be marked INVALID and will be ignored by the projector. A target reflector is marked INVALID when a particular target reflector is beyond the scanning range of the projector or if a target reflector is damaged.

The LEFT mouse button will initiate a target reflector search beginning with an expanding box which quickly locates the rough position of the target reflector, followed by a grid scan to obtain the precise location. Additional scans result if the initial target reflector is not completely contained with the grid. More efficient scanning may result if the original grid is expanded.

If the target reflector is found the operator presses the LEFT mouse button to verify the target reflector selection. The target reflector will be marked as missing if it cannot be found or if the RIGHT mouse button is selected. For example, if a target reflector is located but the wrong target reflector is indicated.

A status message will indicate the calculated laser scanner parameters (y gain, x/y gain ratio, $\dot{x}$ center position, laser misalignment and galvanometer axis misalignment). The final position message give the x, y, z coordinate of the projector in tool coordinates.

Once the laser projector has located the reference targets 30, an algorithm based on a closed-form inverse perspective transformation precisely calculates the relative 3-dimensional orientation and position of each laser projector relative to the tool coordinate system. Closed-form inverse perspective transformation is a known technique. A description of closed-form inverse perspective transformation is found in Rueb, K., "Hypothesis Refinement for 3D Scene Interpretation", PhD Thesis, University of Waterloo, 1990, the contents of which are hereby incorporated by reference.

Inverse perspective transformation is a transformation from a model coordinate system to a specified laser projector reference frame and is defined by length projection vectors p, q and n expressed in the model coordinate system. The inverse transformation from the laser projector coordinate system to the model coordinate system is obtained through the use of projection vectors u, v and w expressed in the laser projector coordinate system. The relative displacement of the model and laser projector coordinate origins is defined by the vector o in the model coordinate system and the vector d in the laser projector coordinate system.

The transformation from model to laser projector coordinates may then be expressed as:

$$\begin{bmatrix} x \\ y \\ z \end{bmatrix} = \begin{bmatrix} p_x & p_y & p_z \\ q_x & q_y & q_z \\ n_x & n_y & n_z \end{bmatrix} \begin{bmatrix} x' \\ y' \\ z' \end{bmatrix} + \begin{bmatrix} d_x \\ d_y \\ d_z \end{bmatrix}$$

and from laser projector to model coordinates by:

$$\begin{bmatrix} x' \\ y' \\ z' \end{bmatrix} = \begin{bmatrix} u_x & u_y & u_z \\ v_x & v_y & v_z \\ w_x & w_y & w_z \end{bmatrix} \begin{bmatrix} x \\ y \\ z \end{bmatrix} + \begin{bmatrix} o_x \\ o_y \\ o_z \end{bmatrix}$$

The projection vectors and displacement may be readily obtained from the 3D location of a single reference feature with position r and two direction vectors a and b specified in laser projector coordinates. The direction vectors may be obtained from the position of three identified target coordinates. The direction vectors and their cross-product c=a×b provide the basis from which the projection vectors u, v and w and displacement d may be defined.

Interpretation in a given context may be then simply defined as a linear function of the basis vectors a, b, c and the reference position r.

Calculation of model configuration without the use of scene or environment constraints requires the correspondence of three distinct image and model feature pairs. It is necessary to calculate the length of the projection rays through each image feature such that the resulting interpoint distances match those of the corresponding model points.

The position of the reference feature and two direction vectors a and b may be used to establish the required transformation. The position of three model points are determined from the projection rays through the corresponding target point features. The constraints imposed by the relative three-dimensional position of the object points in both model and laser projector coordinate systems may be completely expressed by a set of interpoint distances. Solving the equations defining the set of interpoint distances yield scalar quantities from which the transformation from the model reference frame to the laser reference frame may be calculated from the vectors a and b.

Alternatively the set of interpoint distances may be solved by considering that the three sides of a base of a tetrahedron formed by the specified model points. The solution is then derived from the cosine law applied to the corresponding face angles of opposing trihedral angles, formed by the image rays. A solution is obtained by simultaneously solving the system of equations for the three ray lengths which produces a biquadratic polynomial. Roots are found in the closed form solution. For each positive root, a single positive real value can be determined for each of the side lengths. The side lengths represent the scalar values. The transformation from the model reference frame to the laser projector reference frame may then be obtained from the reference vectors a and b.

Periodic retesting of target reflector positions monitors any change, such as movement of the tool, and automatically corrects the projection if specified limits are exceeded.

Once at least six target reflectors are detected by the projector, a numerical approximation algorithm as discussed herein and referenced in the above thesis evaluates the physical characteristics of the scanner mechanism itself (e.g. mirror center position, laser misalignment) to provide automatic correction for factors such as component change with temperature drift.

Finally, all target reflector positions may be continuously tested against a placement tolerance specified in inches on the projection surface. Any deviation from the tolerance will deactivate the projector until the specified tolerance is achieved. The specified set of target reflectors may then be used to continually verify system accuracy during operation. Any four target reflectors may be specified for each tool, however, a separation of a few inches should be maintained between target reflector locations to avoid confusion between target reflector positions.

Figure 11:
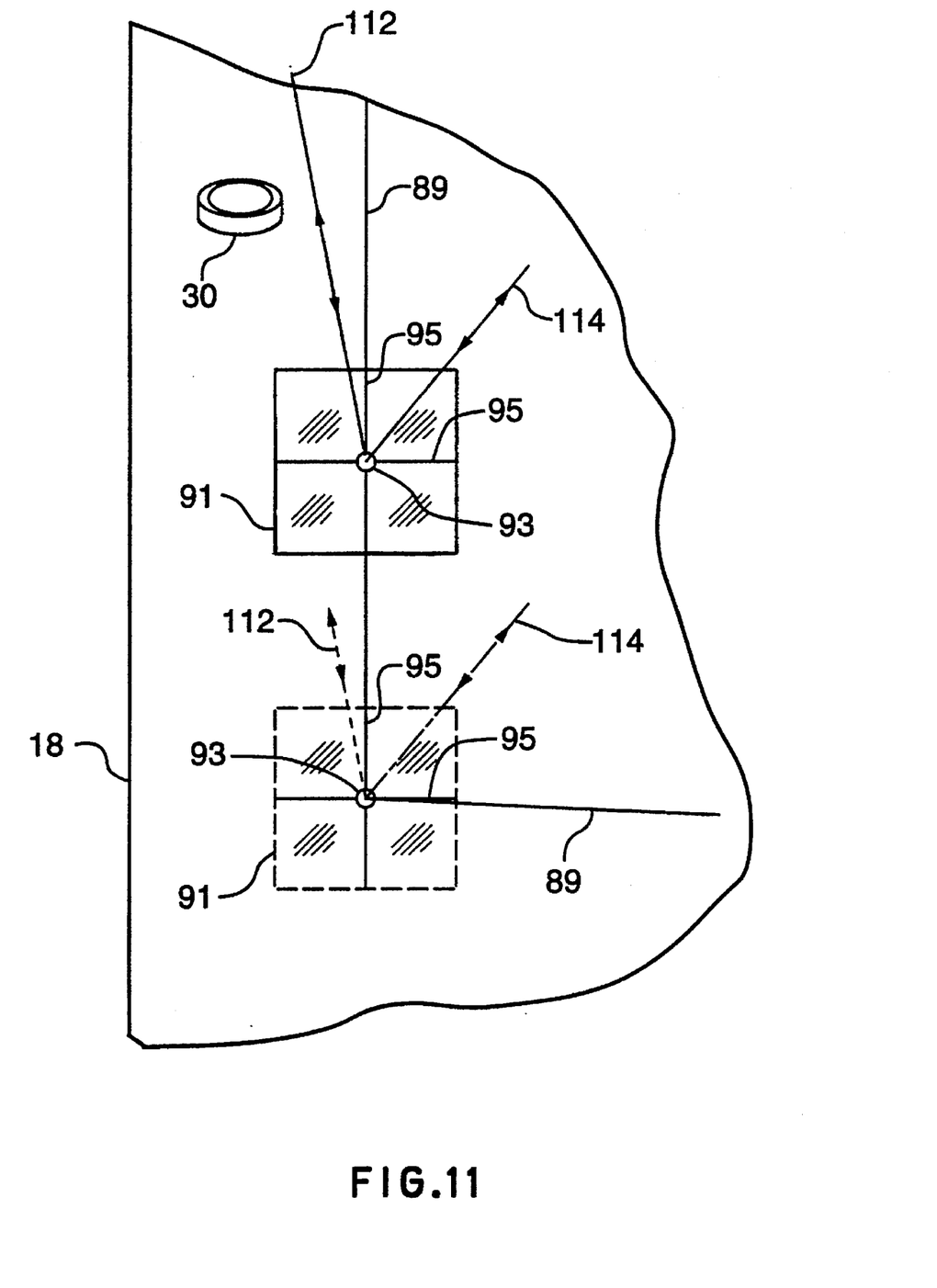
FIG. 11 is a perspective view of a tool being imaged and digitized by the present invention.
Figure 12:
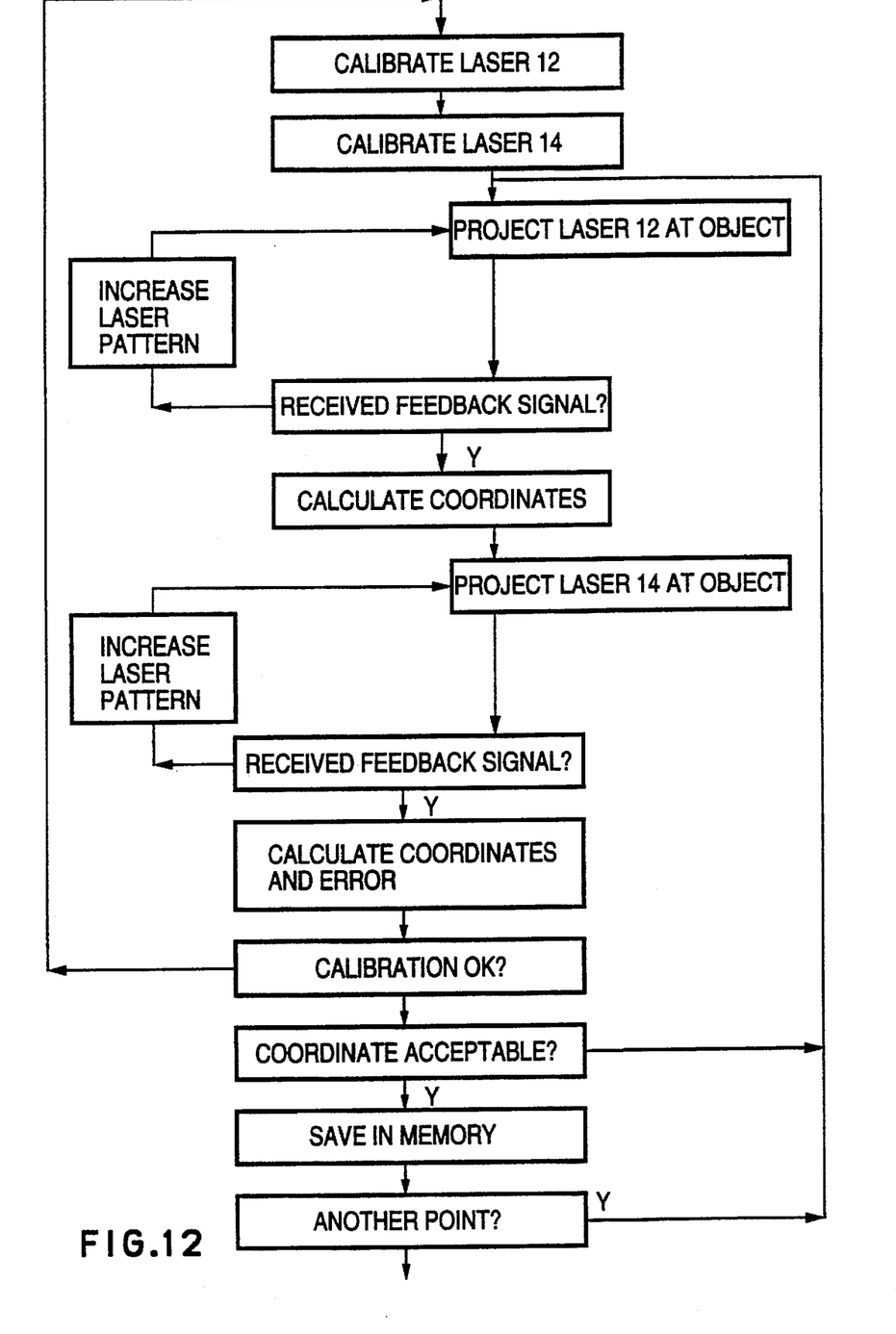
FIG. 12 is a flowchart of the operation logic of the present invention.

Referring to FIGS. 11 and 12, the method of the present invention will be described. In FIG. 11, a tool 18 is illustrated. Line 89 represents a desired feature or contour to be imaged and digitized. Both projectors are calibrated to a tool frame of reference as described above. Projector 12 will project a laser beam 112 onto a point on object or tool 18 which will appear as a laser spot. The point can be anywhere on the surface of the tool. The operator places a target 91 on the surface in the general area of the laser spot. Target 91 is made of a clear plastic sheet and has a set of cross hairs 95. At the point of intersection, the target has a circular retroreflective material 93. Once the laser beam 112 from projector 12 reflects off the retroreflective material 93 back to its source, a first feedback signal is generated. If the first feedback signal is not received within a predetermined amount of time, the laser beam will move in a predetermined outwardly expanding path, e.g. a spiral path, until a feedback signal is received. Once the first feedback signal from projector 12 is received, the vector coordinates of the path of laser beam 112 are calculated.

Projector 14 will also project a laser beam 114 towards the point on the surface. Once the laser beam 114 from projector 14 reflects off the retroreflective material 93 back to its source, a second feedback signal is generated. If the second feedback signal is not received within a predetermined amount of time, the laser beam will move in a preferably spiral path until a second feedback signal is received. Once the second feedback signal from projector 14 is received, the vector coordinates of the path of laser beam 114 are calculated.

By triangulating the vector coordinates of laser beam 112 and 114, the coordinates of the point with respect to the frame of reference may be calculated using known algorithms for triangulating vectors. The 3D coordinates of the point relative to the frame of reference is the midway point of a vector between the path of laser beam 112 and the path of laser beam 114, where the two paths are closest. The amount of error of the 3D location of the point is determined as the distance of the midway point to the path of laser beam 112 and 114.

For simplicity purposes only, the movement of laser beams 112 and 114 have been described as operating sequentially. However, it should be understood that the laser beams 112 and 114 can also operate simultaneously.

If the point is a desirable point and the operator wishes to add the point to a data file in the electronic memory of computer 20, then the computer is directed to store the 3D coordinates in response to a predetermined keyboard hit. If the point is to be discarded, the operator moves the target to a desired point and the process is repeated.

If the target has moved or is moving, thereby terminating the feedback signals, each laser beam will begin to move in the outwardly spiralling path until the target is located. In this manner, the operator can "drag" each laser beam to the desired locations. The operator moves the target slowly discontinuing the feedback signal causing the laser beam to start outwardly spiralling until the laser beam reflects off the target. In this manner, the laser beam will follow the target and "drag" the laser beam to the desired location.

Once at the desired location, the process is repeated producing another digitized data point. The target is repeated moved to desired locations, digitizing each location until a desired set of points have been digitized and stored in the electronic memory. The set of points should describe the pattern of the layout tool being digitized.

Optionally, if the target 91 is not actively moving, a predetermined image can be projected onto the surface intermittently. The image could be the collective image of previously collected 3D coordinates.

In this manner, the collection of 3D coordinates may be compared with the pattern being digitized. If a point does not properly align with the pattern or is otherwise unacceptable, the target is moved to the location of the undesired point. The computer is then directed to erase the 3D coordinate in response to a predetermined keyboard hit. The operator then moves the target to the desired point and the digitizing process is repeated.

Further, the computer 20 may have a receiver 95 for receiving high frequency signals from a remote transmitter 97. The remote transmitter 97 is used by an operator for signalling the computer to store a 3D coordinate data in the electronic memory storage of the computer. This permits a single operator to manipulate the target 91 without the need for a second operator to signal the computer to store a 3D coordinate. This feature is particularly useful when imaging large objects and the computer keyboard may not be placed conveniently near the operator.

Projection to the full resolution of the scanner requires a settling time to allow the mirrors of scanners 42 and 44 to fully adjust to their final position. As a result, if the pattern displayed by either of the projectors is quite complex, the laser may take an excessive period of time to trace the entire pattern and the projection will appear to flicker severely. This problem is amplified if text is desired to be projected onto the surface.

Flicker can be reduced by only showing a subset of the available points of the displayed pattern. Using this method, the projector projects only certain "focus of attention" areas. Each focus of attention area is a segment of the outline (typically about 1 foot) that is displayed very accurately but with little flicker since only a faction of the complete pattern is shown.

The operator identifies a focus of attention area by placing a patch of retroreflective material 90 (FIG. 1) which can be provided on a glove or on a small moveable puck-like object that can be positioned in the path of the laser pattern. The laser beam will be reflected back to the projector which will reflect off the wedge-shaped lens 68 to the photo sensor 80. Photo sensor 80 will generate a feedback signal to the host computer 20. The host computer will automatically reduce the image projected to an area around the point where the feedback signal was received. Since a smaller area is projected, the flicker is reduced. The reduced image will continue provided the feedback signal is received.

The highlighted focus of attention follows the operator's movements as the puck or glove is moved and the laser beam is reflected off the reflective material. Any number of focus of attention zones may be defined in this manner, although an excessively large number of zones will once again result in an increased mount of flicker.

Similarly for text, the text can be hidden and not projected until a feedback signal is received. In place of text, a small symbol can be projected at the starting area of text. When the retroreflective material on the puck or glove is placed in the path of the laser beam near the symbol, a feedback signal will be generated. Upon receiving the feedback signal, the text in the focus of attention will be displayed.

Figure 13:
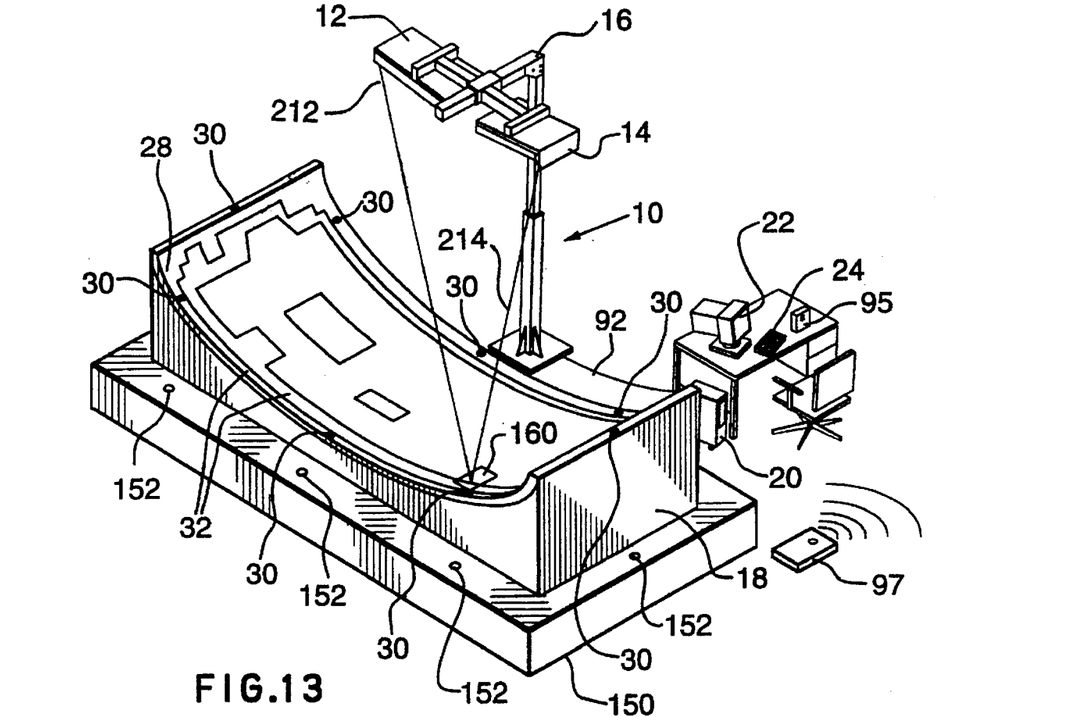
FIG. 13 is a perspective view of the present invention incorporating a calibrating platform.

Referring to FIG. 13, a second embodiment is illustrated. In this embodiment, the tool 18 is mounted on a platform 150. Mounted on platform 150 are retroreflectors 152 which are precisely located at known locations. Preferably, the platform 150 is sized to receive the tool 18 such that at least four retroreflectors 152 are in visual communication with the two laser beams 26 from projectors 12 and 14. At least four retroreflectors must be seen by the laser projectors 12 and 14 to calibrate the projectors 12 and 14 with respect to the platform 150.

Optionally, platform can be provided with castors for moving the platform 150 about.

The use of platform 150 provides the advantage that only the retroreflectors needs to be precisely positioned on platform 150. The retroreflectors 30 mounted about the tool surface 28 need not be as accurately positioned. Using the platform 150 as a known frame of reference, the position of retroreflectors 30 may be determined using the present invention and stored for future use. Since the retroreflectors 30 need not be as accurately positioned, tools 18 may be manufactured at a relatively lower cost. Further, the platform 150 may be repeatedly used with other tools.

Figure 14:
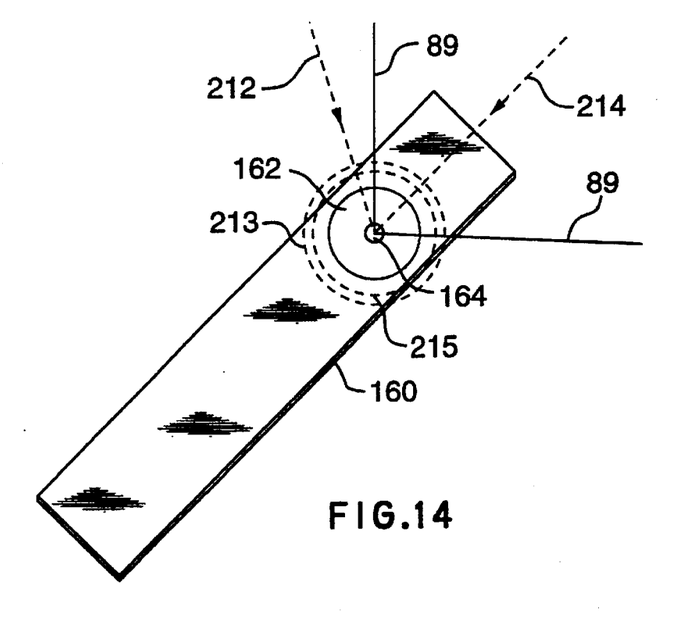
FIG. 14 is a perspective view of a second embodiment of a reflective target of the present invention.

In FIG. 14, another embodiment of the target is illustrated. Target 160 is made of a clear plastic material. One end of target 160 has a disc 162 of retroreflective material. At the center of disc 162 is a hole 164. By making the center clear, it is possible to more accurately align the target with the desired location to be digitized, along line 89 of pattern to be digitized.

The target location routine is modified to locate a hole in a retroreflective material rather than a dot of retroreflective material. The routine will locate the disc 162 by interpreting the receipt of a feedback signal and then will locate the center of hole 164 by interpreting the non-receipt of the feedback signal.

The laser beams 212 and 214 are directed towards the desired location to be digitized. The laser beams 212 and 214 will project in a predetermined pattern and then sequentially be projected across the predetermined pattern in a serpentine pattern. As illustrated, the preferred predetermined pattern is a circle 213 and a circle 215, from laser beams 212 and 214, respectively. By scanning the area defined by circles 213 and 215, and locating the points where a feedback signal is received and not received, i.e. whether the laser beam is retroreflected or not, the disc 162 and the hole 164 can be located. Once the hole has been located, the laser beams 212 and 214 will project the predetermined pattern.

In FIG. 14 circles 213 and 215 are illustrated as having different diameters. However, it is understood that the circles 213 and 215 may have the same diameter.

It is understood that in certain cases, the identification of a hole is preferable to locating a dot. In others, the reverse is true. Accordingly, the routine is provided with a switch for switching between locating a hole or a dot.

Although the disclosure describes and illustrates the preferred embodiments of the invention, it is understood that the invention is not limited to these particular embodiments. Many variations and modifications will now occur to those skilled in the art. For definition of the invention, reference is made to the appended claims.

We claim:

1. A method for generating 3D data of an object using a laser projector comprising the steps of:

establishing a coordinate system by selecting at least four non-redundant reference targets on an object, calibrating at least two laser projectors to said coordinate system by using each of said laser projectors to locate said at least four non-redundant reference targets and calculating a relative 3-dimensional orientation and position of each of said laser projectors relative to said coordinate system, projecting at least two laser beams along respective paths to a desired point on said object;

calculating vector coordinates for each respective path of said laser beams when each of said laser beams intersects said point; and triangulating said vector coordinates establishing a digitized 3D coordinate of said point relative to said coordinate system.

2. A method as claimed in claim 1 wherein said method further includes a step of generating a feedback signal when each of said laser beams intersect said point and said step of calculating said vector coordinates is responsive to each of said feedback signals.

3. A method as claimed in claim 2 wherein said method further includes a step of reflecting said lasers beams off said point for triggering each of said feedback signals.

4. A method as claimed in claim 3 wherein said method includes a step of refracting said laser beams towards a light sensor which is responsive to said laser beams for generating said feedback signals.

5. A method as claimed in claim 4 wherein said steps of projecting said laser beams includes a step of focusing each of said lasers beams through an aperture of a wedge-shaped lens adapted to refract said laser beams towards said light sensor.

6. A method as claimed in claim 3 wherein said step of generating said feedback signals includes a step of manipulating a target reflector to said point for reflecting said laser beams.

7. A method as claimed in claim 6 wherein said step of projecting said laser beams includes a step of moving each of said laser beams in a predetermined pattern until each of said laser beams reflects off said reflective target.

8. A method as claimed in claim 7 wherein said step of moving said laser beams commences after a predetermined amount of time.

9. A method as claimed in claim 8 wherein said predetermined pattern is an expanding spiral.

10. A method as claimed in claim 7 wherein each of said laser beams are refracted towards a light sensor for generating said feedback signals.

11. A method as claimed in claim 10 wherein said step of projecting said laser beams includes generating each of said laser beams with a laser light source, focusing each of said laser beams through an aperture of a wedged-shape lens, directing said laser beams towards said point and said step of generating said feedback signals includes reflecting said laser beams off said point back towards said laser light source, refracting said laser beams with said wedged-shape lens towards said light sensor.

12. A method as claimed in claim 11 wherein a reflective target is manipulated to said point to reflect each of said laser beams.

13. A method as claimed in claim 12 wherein said calibration step includes a step of projecting said a laser beam from each of said laser projectors to a plurality of known locations on said object, calculating vector coordinates of each of said known locations and triangulating said vector coordinates establishing a relative 3D orientation and position of each said known locations relative to said object.

14. A method as claimed in claim 13 wherein said steps of triangulating vector coordinates is a closed-form inverse perspective transformation.

15. A method as claimed in claim 1 wherein said method includes a step of storing said 3D coordinate in an electronic memory storage device.

16. A method as claimed in claim 15 wherein said 3D coordinate is stored responsive to an external signal.

17. A method as chimed in claim 16 wherein said external signal is a generated by a computer mouse.

18. A method as claimed in claim 16 wherein said external signal is remotely generated and transmitted to a receiver electrically connected to said electronic memory storage device.

19. A method as claimed in claim 16 wherein said method is repeated for a plurality of points to generate a series of digitized 3D coordinates.

20. A method as claimed in claim 19 wherein said method includes the step of periodically re-calibrating the at least two laser projectors.

21. A method as claimed in claim 19 wherein said method further includes a step of generating an image representative of said series of digitized 3D coordinates and laser projecting said image onto said object.

22. A method as claimed in claim 1 wherein said method further includes a step of terminating a feedback signal when each of said laser beams intersect said point and said step of calculating said vector coordinates is responsive to the termination of each of said feedback signals.

23. A method as claimed in claim 22 wherein said method is switchable from terminating said feedback signal to a step of generating a feedback signal when each of said laser beams intersect said point and said step of calculating said vector coordinates is responsive to each of said feedback signals.

24. A method as claimed in claim 23 wherein said method includes a step of refracting said laser beams towards a light sensor which is responsive to said laser beams for generating said feedback signals.

25. A method as claimed in claim 24 wherein said steps of projecting said laser beams includes a step of focusing each of said lasers beams through an aperture of a wedge-shaped lens adapted to refract said laser beams towards said light sensor after each of said laser beams is reflected.

26. A method as claimed in claim 25 wherein said step of terminating said feedback signals includes a step of manipulating a target reflector having a non-reflecting center to said point.

27. A method as claimed in claim 26 wherein said step of generating said feedback signals includes a step of manipulating a target reflector to said point for reflecting said laser beams.

28. A method as claimed in claim 27 wherein said step of projecting said laser beams includes a step of moving each of said laser beams in a predetermined pattern until each of said laser beams reflects off said reflective target.

29. A method as claimed in claim 28 wherein said predetermined pattern is a circle.

30. A method as claimed in claim 1 wherein said method further includes a step of providing a platform having retroreflectors in a predefined pattern defining a reference coordinate system and said object is placed on said platform for generating 3D data thereof.

31. A method as claimed in claim 30 wherein said method includes the step of calibrating said at least two laser projectors to the reference coordinate system.

32. A method for generating 3D data of an object using at least two laser projectors comprising the steps of:
   establishing a coordinate system by selecting at least four non-redundant reference targets on an object,
   calibrating at least two laser projectors to said coordinate system by using each of said laser projectors to locate said at least four non-redundant reference targets and calculating a relative 3-dimensional orientation and position of each of said laser projectors relative to said coordinate system,
   generating a first laser beam with a first laser light source, focusing said first laser beam through an aperture of a first wedged-shape lens,
   directing said first laser beam towards a point on said object,
   reflecting said first laser beam off a reflective target manipulated to said point back towards said first laser light source,
   refracting said first laser beam with said first wedged-shape lens towards a first light sensor generating a first feedback signal,
   responsive to said first feedback signal, calculating first vector coordinates of said first laser beam;
   generating a second laser beam with a second laser light source, focusing said second laser beam through an aperture of a second wedged-shape lens,
   directing said second laser beam towards said point,
   reflecting said second laser beam off said reflective target back towards said second laser light source,
   refracting said second laser beam with said second wedged-shape lens towards a second light sensor generating a second feedback signal,
   responsive to said second feedback signal, calculating second vector coordinates of said second laser beam;
   triangulating said first vector coordinates with said second vector coordinates establishing a digitized 3D coordinate of said point relative to said coordinate system.

33. A method as claimed in claim 32 wherein said method further includes a step of storing said 3D coordinate in an electronic memory storage device.

34. A method as claimed in claim 33 wherein said method is repeated for a plurality of points to generate a series of digitized 3D coordinates.

35. A method as claimed in claim 34 wherein said method includes the step of periodically calibrating the at least two laser projectors.

36. A method as claimed in claim 35 wherein said method further includes a step of generating an image representative of said series of digitized 3D coordinates and periodically laser projecting said image onto said object.

37. A method for generating 3D data of an object using at least two laser projectors comprising the steps of:
   calibrating at least two laser projectors to a coordinate system relative to an object;
   generating a first laser beam with a first laser light source, focusing said first laser beam through an aperture of a first wedged-shape lens,
   directing said first laser beam towards a point on said object,
   reflecting said first laser beam off a reflective target manipulated to said point back towards said first laser light source,
   refracting said first laser beam with said first wedged-shape lens towards a first light sensor generating a first feedback signal,
   responsive to said first feedback signal, calculating first vector coordinates of said first laser beam;
   generating a second laser beam with a second laser light source, focusing said second laser beam through an aperture of a second wedged-shape lens,
   directing said second laser beam towards said point,
   reflecting said second laser beam off said reflective target back towards said second laser light source,
   refracting said second laser beam with said second wedged-shape lens towards a second light sensor generating a second feedback signal,
   responsive to said second feedback signal, calculating second vector coordinates of said second laser beam;
   triangulating said first vector coordinates with said second vector coordinates establishing a digitized 3D coordinate of said point relative to said coordinate system;
   storing said 3D coordinate in an electronic memory storage device;
   repeating said method for a plurality of points to generate a series of digitized 3D coordinates;

periodically calibrating the at least two laser projectors;

generating an image representative of said series of digitized 3D coordinates and periodically laser projecting said image onto said object; and projecting only a portion of said image near a point of interest, responsive to a feedback signal being received from the point of interest.

38. A method as claimed in claim 37 wherein said method further includes a step of manipulating a target reflector to said point of interest.

39. A method as claimed in claim 38 wherein said image includes additional text information and said method further includes a step of projecting a symbol indicative of a presence of said text information and projecting said text information responsive to a feedback signal.

40. A method as claimed in claim 39 wherein said method further includes a step of manipulating a target reflector to said symbol.

41. A method as claimed in claim 40 wherein said calibration steps includes a step of projecting said laser beams from each of said laser projectors to a plurality of known locations on said object, calculating vector coordinates of each of said known locations and triangulating said vector coordinates establishing a relative 3D orientation and position of each said known locations relative to said object.

42. A method as claimed in claim 41 wherein said steps of triangulating vector coordinates is a closed-form inverse perspective transformation.

43. A method as claimed in claim 1 wherein said step of calibrating includes calibrating said two laser projectors to a reference platform and then calibrating said object to said reference platform.

44. A method as claimed in claim 43 wherein said reference platform is sized to receive said object and said object rests on said platform when undergoing said calibrating.

45. A method as claimed in claim 44 wherein said platform has a plurality of retroreflective targets at predetermined locations thereabout.

46. A method as claimed in claim 45 wherein at least four of said plurality of retroreflective targets reflect said laser beam when said objects rests thereon.

* * * * *

UNITED STATES PATENT AND TRADEMARK OFFICE
CERTIFICATE OF CORRECTION

PATENT NO. : 5,661,667
DATED : August 26, 1997
INVENTOR(S) : Kurt D. RUEB et al.

It is certified that error appears in the above-identified patent and that said Letters Patent is hereby corrected as shown below:

On the title page, before item [63], insert -- [30] Foreign Application Priority Data, Apr. 9. 1994 [GB] United Kingdom   9407090 --

Signed and Sealed this

Third Day of March, 1998

Attest:

BRUCE LEHMAN

Attesting Officer

Commissioner of Patents and Trademarks